US005594926A

United States Patent [19]
Chang et al.

[11] Patent Number: 5,594,926
[45] Date of Patent: Jan. 14, 1997

[54] HARD DISK ACCELERATING SYSTEM FOR COMPUTER

[75] Inventors: Ying-Feng Chang; Juei-Sheng Sheu, both of San Jose, Calif.

[73] Assignee: EFAR Microsystems, Inc., Santa Clara, Calif.

[21] Appl. No.: 93,373

[22] Filed: Jul. 19, 1993

[51] Int. Cl.[6] ...................................................... G06F 13/00
[52] U.S. Cl. .......................... 395/872; 395/250; 395/841; 395/854; 395/306; 395/433; 364/DIG. 1; 364/DIG. 24; 364/240.5; 364/240.3; 364/926.3; 364/926.61
[58] Field of Search ............................... 364/200 MS File, 364/900 MS File; 395/400, 425, 495, 872, 873, 881, 250, 840, 841, 852, 853, 854, 882, 306, 433

[56] References Cited

U.S. PATENT DOCUMENTS

| | | | |
|---|---|---|---|
| 4,575,796 | 3/1986 | Wako | 395/325 |
| 4,779,234 | 10/1988 | Kaneko et al. | 365/221 |
| 4,792,926 | 12/1988 | Roberts | 365/189 |
| 4,847,809 | 7/1989 | Suzuki | 365/189.04 |
| 4,956,768 | 9/1990 | Sidi et al. | 395/873 |
| 5,163,132 | 11/1992 | DuLac et al. | 395/873 |
| 5,220,529 | 6/1993 | Kohiyama et al. | 365/189.01 |
| 5,224,214 | 6/1993 | Rosich | 395/872 |
| 5,261,057 | 11/1993 | Coyle et al. | 395/308 |
| 5,337,414 | 8/1994 | Hashemi et al. | 395/275 |
| 5,339,399 | 8/1994 | Lee et al. | 395/425 |
| 5,392,412 | 2/1995 | McKenna | 395/872 |
| 5,459,839 | 10/1995 | Swarts et al. | 395/872 |

OTHER PUBLICATIONS

"Local Bus IDE Interface," Product Brief, Appian, Nov. 1992, pp. 1–3.

Primary Examiner—Eddie P. Chan
Assistant Examiner—Hiep T. Nguyen
Attorney, Agent, or Firm—Skjerven, Morrill, MacPherson, Franklin & Friel; Ronald J. Meetin

[57] ABSTRACT

The present invention provides a hard drive accelerating system (32) that substantially improves the hard disk data transfer speed in a computer. The accelerating system decomposes a traditional CPU IO command to read or write a hard disk drive (18) into two separate tasks that can be executed concurrently. A read buffer (40) and a write buffer (42) are used to link the two tasks. A state machine (48) generates consecutive IO read cycles to fetch data from the hard drive to the read buffer while the CPU executes IO commands to retrieve data from the read buffer. A programmable hardware register (49) adjusts the hard disk IO cycle time to achieve maximum compatibility with different hard drive speeds.

21 Claims, 12 Drawing Sheets

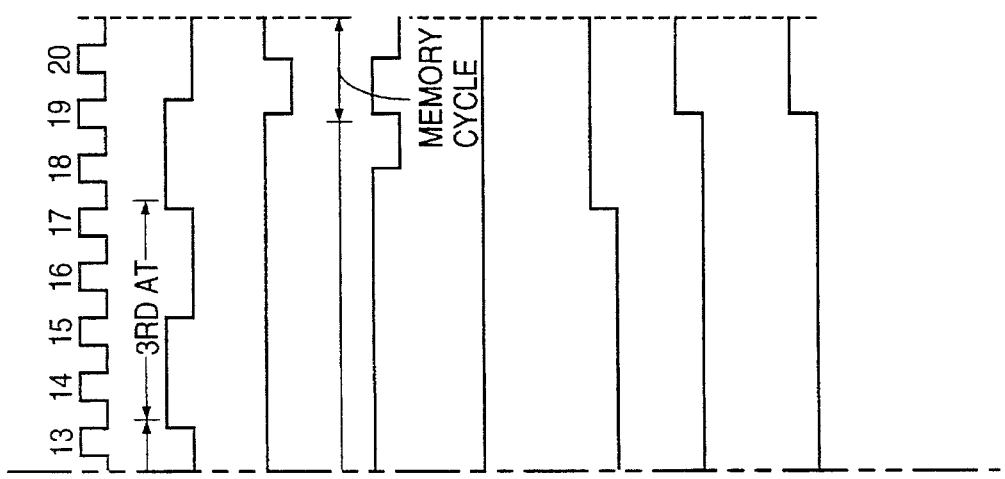

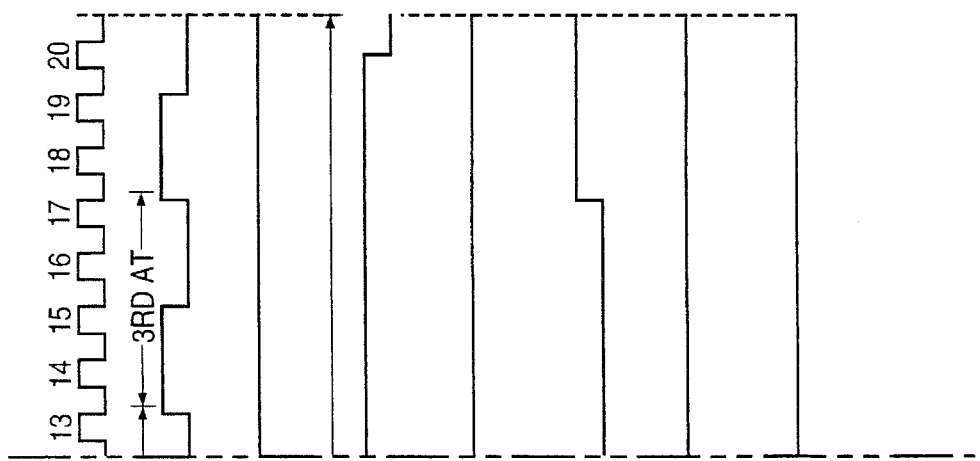

FIG. 8A

IDLE:
If (CPU 10 reads IO port 1F0H or 170H) Then
   Set machine state 50 of machine 48
      to INIT-RD;
   Goto INIT-RD;
Else
   GOTO IDLE;

INIT-RD:
Set word counter 44, registers 45 and 47
   to zero;
Latch the address of the IO command from
   system bus 14 into register 49;
Set machine state 50 of machine 48
   to BURST-RD;
Goto Burst-RD;

BURST-RD:
While (word counter 44 is less than 256) Do
RD-Loop:
If (there is a normal AT cycle request OR
   a CPU hold request OR
   a DRAM hidden refresh request ) Then
   Set machine state 50 to SUSPEND-RD;
   Goto SUSPEND-RD;

SUSPEND-RD:
If ( no pending AT cycle requests  AND
   no pending DRAM hidden refresh requests
   AND no pending CPU hold requests ) Then
   Set machine state 50 to BURST-RD state;
Else
   Goto SUSPEND-RD;

END-RD:
If ( EMPTY 62 is 1 ) Then
   Set machine state 50 to IDLE;
   Goto IDLE;
Else
   Goto END-RD;

CPU-READ:
If ( CPU reads IO port 1F0H or 170H) Then
   If ( Machine state 50 is IDLE)
      Goto INIT-RD;
Check-Buffer:
   If ( it is a 16-bit IO cycle) Then
      Goto INIT-RD;
   If ( EMPTY 62 is 0) Then
      Enables MUXes 56 to output data of the two

```
If (FULL 64 is 0) Then
    Output address HD-ADDR from register 49
        to the address lines of ISA bus 22;
    Assert IO cycle to fetch 2 bytes of data from
        hard drive 18;
    Store the retrieved data from ISA bus 22 to
        unit 54 of WIND address;
    Add 1 to register 47 and word counter 44;

/* Update read buffer status flags*/
    Set EMPTY 62 to 0;
    If (WIND = RIND)
        Set FULL 64 and HALF-FULL 63 both to 1;
    Else if (WIND = ( (RIND +1) MOD 4) )
        Set FULL 64 and HALF-FULL 63 both to 0;
    Else
        Set FULL 64 to 0, and set HALF-FULL 63 to 1;
    Continue;
Else
    Goto RD-Loop;
End;
/* Reach the End of a sector */
Set machine state 50 to END-RD;
Goto END-RD;-
```

```
    units 54 selected by RIND to the data
        lines [0-31] of system bus 14;
    Add 1 to the register 45;
Else
    Goto Check_Buffer;
Else if (it is a 32-bit IO cycle) Then
    If (FULL 64 or HALF-FULL 63 is 1) Then
        Enables MUXes 56 to output data of the two
            units 54 selected by RIND to the data
            lines [0-31] of system bus 14;
        Add 2 to the register 45;
    Else
        Goto Check_Buffer;
    End;
End;
/* Updates read buffer status flags*/
Set FULL 64 to 0;
If (WIND =RIND)
    Set EMPTY 62 to 1, and set HALF-FULL 63 to 0;
Else if (WIND = ( (RIND + 1) MOD 4) )
    Set EMPTY 62 and HALF-FULL 63 both to 0;
Else
    Set EMPTY 62 to 0, and set HALF-FULL 63 to 1;
END:
```

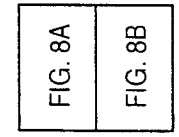

FIG. 8

HARD DISK ACCELERATING SYSTEM FOR COMPUTER

TECHNICAL FIELD

The present invention relates to computer systems and, more particularly, to hard disk control logic for a computer system such as a personal computer ("PC") advanced technology ("AT") compatible system.

BACKGROUND AND PRIOR ART

FIG. 1 shows a conventional PC AT (registered IBM trademark) computer system consisting of a central processing unit ("CPU"), a system bus, a system memory, a memory controller, an Industrial Standard Architecture ("ISA") AT bus, an ISA AT bus controller and peripheral devices. The system bus which transmits data, address and control signals, is a high speed bus connecting the CPU, system memory, and other controllers together. The ISA AT bus is defined to have a 16-bit data bus, a 24-bit address bus, and control signals as well as input/output ("IO") port addresses assigned for various types of peripherals. For instance, IO port address 1F0H is assigned as the data port address of one or two primary hard disk drives, and IO port address 170H is assigned as the data port address of one or two secondary hard disk drives. FIG. 1 illustrates one such hard disk drive.

The system bus normally runs at a considerably higher clock rate than the ISA AT bus. For a 33-MHz 386 PC AT system, the system bus runs at 33 MHz while the ISA AT bus runs at 6 to 8 MHz.

The ISA AT bus controller, sitting between the system bus and the ISA AT bus, transmits data, address and control signals between the system bus and the ISA AT bus so that the CPU can perform operations on peripheral devices, such as a hard disk or a display monitor, through a peripheral controller, such as an Integrated Device Electronics ("IDE") controller and/or a graphics display controller. The peripheral device controller can be either assembled on a printed-circuit-board ("PCB"), referred to as the main board, with the CPU and memory subsystem or plugged into one of several 8-bit or 16-bit expansion slots generally available on the main board.

To allow storage peripherals to be attached to the ISA AT bus, the American National Standard for Information Systems ("ANSIS") AT Attachment ("ATA") specification defines a compatible register set and a 40-pin connector, including its associated signals. For example, an IDE interface hard disk drive strictly follows the bus interface requirements defined in the ANSIS ATA. Therefore, the IDE hard drive can be attached to the ISA AT bus.

A hard disk drive contains one or more disk plates. Each of disk plates is formatted into tracks and sectors. The number of tracks on a disk plate can vary from drive to drive, though the size of a sector is defined to be 512 bytes of data.

Each hard disk drive normally contains registers to receive commands from the CPU, and a data register for the CPU to retrieve data from the hard drive or store data into the hard drive. The AT specification assigns 1F0H as the address of the data register in each primary hard drive, and 170H as the address of the data register in each secondary hard drive.

In a PC AT computer system which uses an IDE hard disk drive for data storage, a conventional ISA IO control chip, such as the FDC37C6xx series of Standard Microsystems, the PC873xx series of National Semiconductor, the W83757 of Winbond Electronics, or the ALI M5107 of Acer Lab., can be used to control the IDE hard drive.

To read data from the IDE hard drive and write the data into the system memory, the CPU first issues a disk read command and passes a sector number to the hard disk through the ISA AT bus controller and the IDE hard drive controller. The IDE hard drive, having been informed of the disk read command and sector number, moves data from the hard disk sector into the sector buffer of the IDE hard drive for the CPU to access. The CPU then executes a 16-bit IO instruction to input data from IO port 1F0H or 170H. The ISA IO controller decodes the IO address and activates the hard drive to output 16-bit data to the ISA AT bus. The ISA AT bus controller then moves the data from the ISA AT bus to the system bus. In the same instruction cycle, the CPU stores the data received from the system bus into the system memory. This completes a 16-bit hard disk data read operation.

FIG. 2 shows signal waveforms of 16-bit hard drive data read operations for a PC AT system with a 33 MHz CPU clock and an 8 MHz AT bus clock. The CPU first places IO port address 1F0H or 170H on the system address bus, activates the address strobe signal ADS__, and drives the memory/IO cycle indicating signal MIO__ low to initiate an IO cycle. The underline (__) at the end of a signal, such as the ADS__ or MIO__ signal, indicates that it is active low.

The activated ADS__ signal triggers the ISA AT bus controller to forward the IO port address to the AT bus and activate the address latch signal ALE of the AT bus for the IDE controller to latch and decode the IO port address. The ALE signal is deactivated by the end of the first AT clock cycle. The AT bus controller then enables the IO read signal IOR__, which triggers the hard drive to output data to the AT bus. The IOR__ signal is deactivated by the end of the third AT clock cycle if the IDE hard drive does not assert an IO channel-ready signal (not shown) to request longer response time. The IDE data is moved from the AT bus to the system bus by the AT bus controller. It then asserts the data ready signal RDY__ for the CPU to latch the data and finish the IO read cycle.

After the IO read cycle, the CPU places the memory address and the latched hard disk data on the system bus, activates the strobe signal ADS__, and drives both the MIO__ signal and the write/read indicating signal WR__ high to generate a memory write cycle for storing the hard disk data into the system memory. This completes a 16-bit "read hard disk, write memory" operation.

As shown in FIG. 2, the CPU generates 16-bit IO read and memory write cycles one after the other. Since 16 bits is 2 bytes, to move a whole sector—i.e. 512 bytes—of data from the hard drive to the system memory, the 16-bit AT IO read and memory write cycles must be repeated 256 times. In between the 16-bit data transfer operations, "back to back AT IO cycle delay" may be needed to ensure compatibility with slow hard drive. The use of "back to back AT IO cycle delay" in between 16-bit data transfers increases the data transfer cycle time and slows down the data transfer rate.

In an Intel i3/486-based computer system, 16-bit IO instruction REP INS is commonly used in the Basic Input and Output System ("BIOS") to move data from the hard drive's IO data port to the system memory. The REP INS instruction repeatedly performs "input data from IO port, then write the input data to memory" operations until a designated loop count is reached. For each REP INS loop, one 16-bit AT IO read cycle is needed to input data from the IDE drive, and 6 CPU clocks are needed to store the IDE data into the system memory and prepare for the next loop to start. FIG. 2 shows that the 16-bit AT IO read cycle requires at least 3 AT bus clocks to finish.

For a 33-MHz Intel i486-based system with an 8-MHz AT bus clock, 30 ns and 120 ns respectively are the approximate durations for the CPU clock and the AT clock. Therefore, it takes at least (6×30 ns)+(120×3)=540 ns to complete a 16-bit data read transfer from the hard drive to the system memory. This translates into a maximum data transfer rate of 3.7 megabytes per second, assuming that no "back to back AT IO cycle delay" is required by the hard drive and that the data is always available for the CPU to access on the hard drive.

To read data from the system memory and write the data into the hard disk drive, the CPU first executes an IO output instruction that causes a command to be issued, via the ISA AT bus controller and the hard drive controller, to the hard drive to request a sector buffer. When the hard drive is ready to receive data, the CPU generates a memory read cycle to read data from the system memory. The CPU then generates a 16-bit IO write cycle to write the data into the hard disk data port. The ISA IO controller decodes the IO port address, and moves data from the system bus into the sector buffer of the hard drive via the AT bus. This completes a 16-bit hard drive data write operation.

FIG. 3 shows signal waveforms of 16-bit hard drive data write operations for a PC AT system with a 33-MHz CPU clock and an 8-MHz AT bus clock. The CPU first reads data from the system memory by outputting the memory address to the system bus and activating address strobe signal ADS__. The ready signal RDY__ is then asserted by the memory controller to inform the CPU that memory data is ready to latch. When the memory data is fetched into the CPU, it starts an IO write cycle by asserting IO port address 1F0H or 170H on the system address bus, generating the ADS__ signal and IO cycle indicating signal MIO__ followed by outputting the latched data onto the system data bus. These signals trigger the AT bus controller to forward the IO port address to the AT bus, and supply address latch signal ALE to the hard disk controller by the end of the first AT clock.

The hard disk controller, triggered by the activated ALE signal, decodes the IO port address and prepares to receive data from the AT bus controller. Data is then routed from the system bus to the AT bus, and the IO write signal IOW__ is activated in the middle of the 2nd AT clock by the AT bus controller. The IOW__ signal is deactivated by the end of the third AT clock if the hard drive does not assert the IO channel-ready signal (not shown) to request longer response time. The RDY__ signal is then activated to indicate the end of the IO write operation.

As shown in FIG. 3, the CPU must generate memory read and 16-bit IO write cycles one after the other to fetch data from the system memory and store it into the hard disk's data port. To move a whole sector—i.e. 512 bytes—of data from the system memory to the hard drive, the 16-bit memory read and AT IO write cycles must be repeated 256 times. In between the 16-bit data transfer operations, "back to back AT IO cycle delay" may be needed to ensure compatibility with slow hard disk drive. The use of "back to back AT IO cycle delay" in between 16-bit data transfers again increases the data transfer cycle time and slows down the data transfer rate.

In an Intel i3/486-based computer system, 16-bit IO instruction REP OUTS is commonly used in the BIOS to move data from the system memory to the hard disk. The REP OUTS instruction repeatedly performs "read data from the system memory, and write the data into a designated IO port" operations until a designated loop count is reached. For each REP OUTS loop, according to Intel's published data, one 16-bit AT IO write cycle is needed to output data to the IO port, and 5 CPU clocks are needed to read data from the system memory and prepare for the next loop to start. FIG. 3 shows that a 16-bit AT IO write cycle requires at least 3 AT clocks to finish.

For a 33-MHz Intel i486-based system with an 8-MHz AT bus clock, it takes at least (5×30 ns)+(120×3)=510 ns to complete a 16-bit data write transfer to the hard drive. This translates into a maximum data transfer rate of 3.9 megabytes per second if no "back to back AT IO cycle delay" is required by the hard drive.

OBJECTS OF THE INVENTION

An object of the present invention is to provide a hard disk drive accelerating system that can substantially increase the data transfer speed between system memory and hard disk drives, which comply to the ANSIS ATA specification, through a conventional ISA AT bus of a PC AT compatible system.

Another object of the invention is to provide a software programmable control scheme to increase data transfer speed with various types of hard disk drive.

A further object of the invention is to provide system compatibility with existing ISA AT peripheral controllers while supporting the present hard drive control system.

Other objects and features of the invention will be apparent from the description of the invention given below.

SUMMARY OF THE INVENTION

The present invention provides a hard disk accelerating system for a computer that contains a CPU, a system memory, and a hard disk drive divided into sectors and having a data register. The CPU and system memory are coupled to a first bus. The hard drive is coupled to a second bus that operates at a lower clock rate than the first bus.

The accelerating system decomposes hard disk access operation into two or more tasks which can be executed concurrently. The accelerating system performs this decomposition with a read buffer for storing data received from the hard drive, a write buffer for storing data to be stored in the hard drive, and a control and state machine for monitoring IO operations performed on the hard drive by the CPU. The control and state machine determines when to start, suspend, resume, and end fetching data from a hard drive sector, generates IO read cycles to read data from the hard drive, and supplies data from the read buffer to the CPU when the CPU initiates an IO read cycle to read data from the hard drive while it is concurrently fetching data from the hard drive. The control and state machine also latches data in the write buffer when the CPU initiates an IO write cycle to write data to the hard drive, and generates an IO write cycle to write the latched data to the hard drive while the CPU is reading data from the system memory for the next IO write cycle.

This accelerating system is particularly suitable for an ISA AT bus based PC where the hard drive is an IDE disk drive compliant with the ANSIS ATA specification.

The accelerating system further contains register bits to control the IO cycle time for different speeds of hard disk drives, and means to temporary suspend hard drive IO cycles for a normal IO bus cycle, a IO bus refresh cycle, and/or a CPU hold cycle.

BRIEF DESCRIPTION OF THE DRAWINGS

FIGS. 2A and 2B (collectively "FIG. 2") are a timing diagram for hard drive read cycles of the conventional ISA system in FIG. 1.

FIGS. 3A and 3B (collectively "FIG. 3") are timing diagram for hard drive write cycles of the conventional ISA system in FIG. 1.

FIGS. 8A and 8B (collectively "FIG. 8") are a flow diagram for the inventive system of FIG. 4.

DESCRIPTION OF THE PREFERRED EMBODIMENT

Figure 4A:
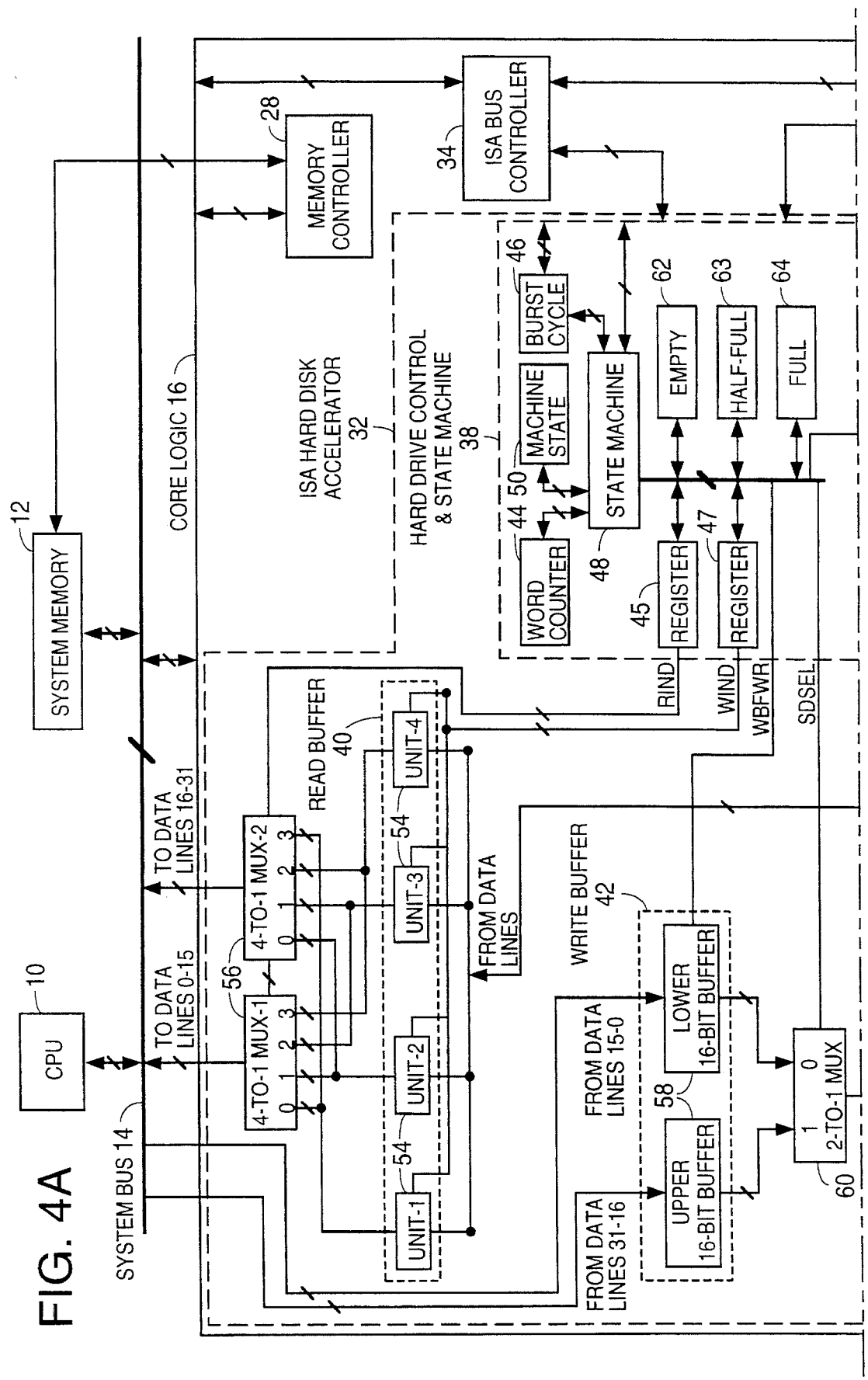
FIGS. 4A and 4B (collectively "FIG. 4") are a block diagram of a PC AT ISA-based system with an hard disk accelerator built in according to the invention.
Figures 4, 4B:
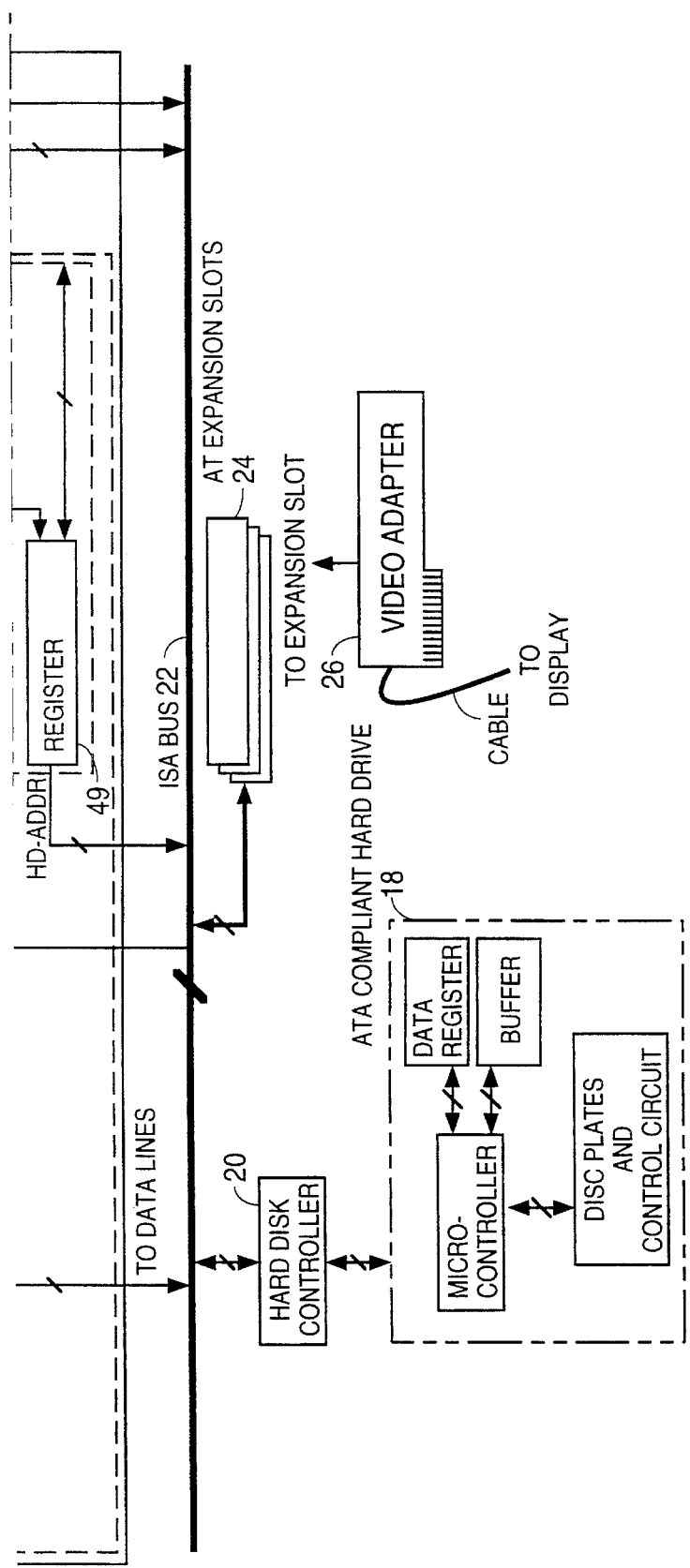

Referring to FIG. 4, it illustrates an embodiment of an ISA AT bus-based PC AT compatible computer which contains an ANSIS ATA compliant hard disk accelerating system in accordance with the invention. The computer in FIG. 4 consists of a CPU 10, a system memory 12, a system bus 14, core logic 16, one or more ANSIS ATA compliant hard disk drives such as IDE hard drive 18, a hard disk controller 20, an ISA AT bus 22, AT expansion slots 24, and an AT bus peripheral controller such as a video adapter 26.

Figure 1:
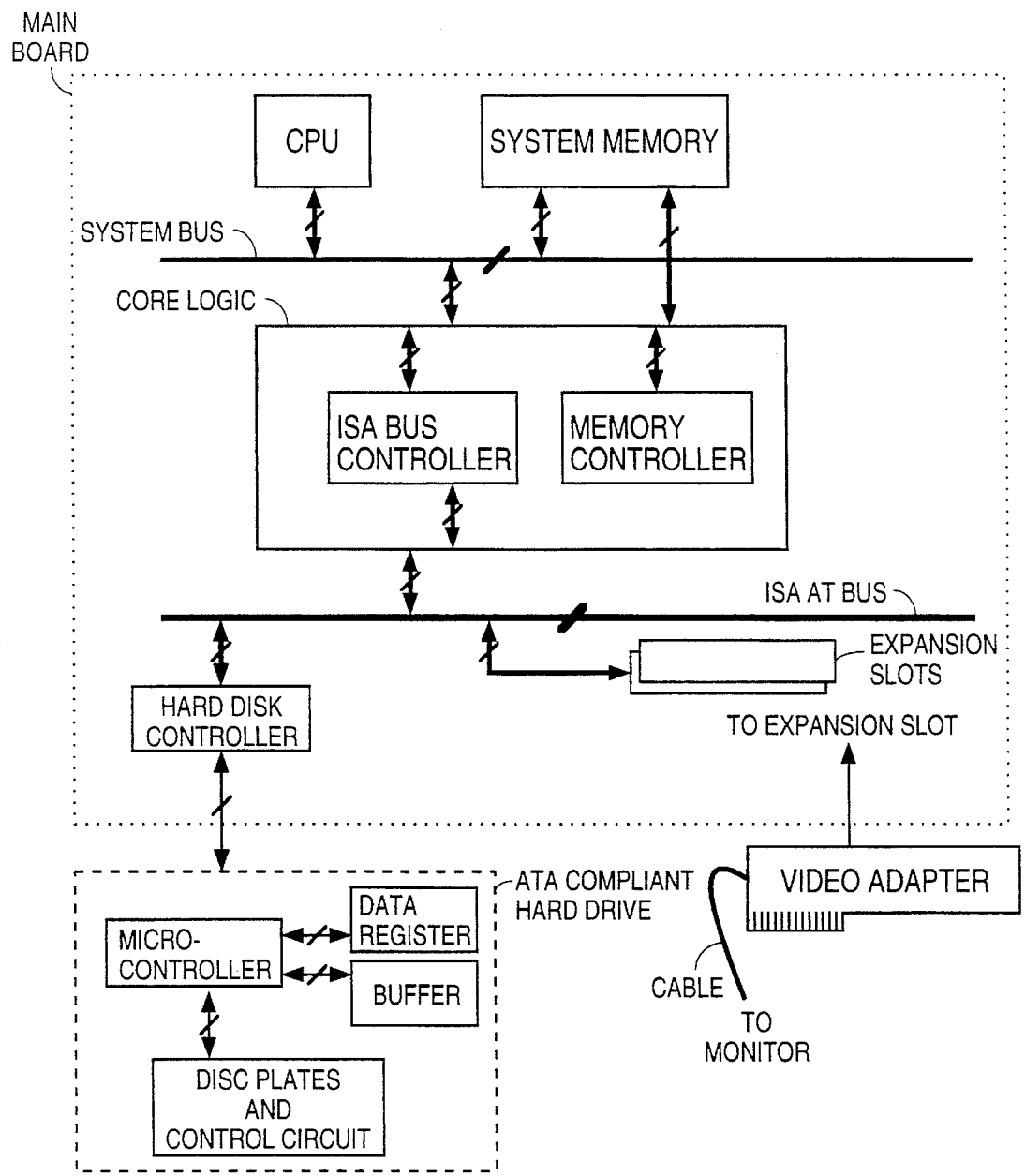
FIG. 1 is a block diagram of a prior art ISA AT based computer system.
Figure 2A:
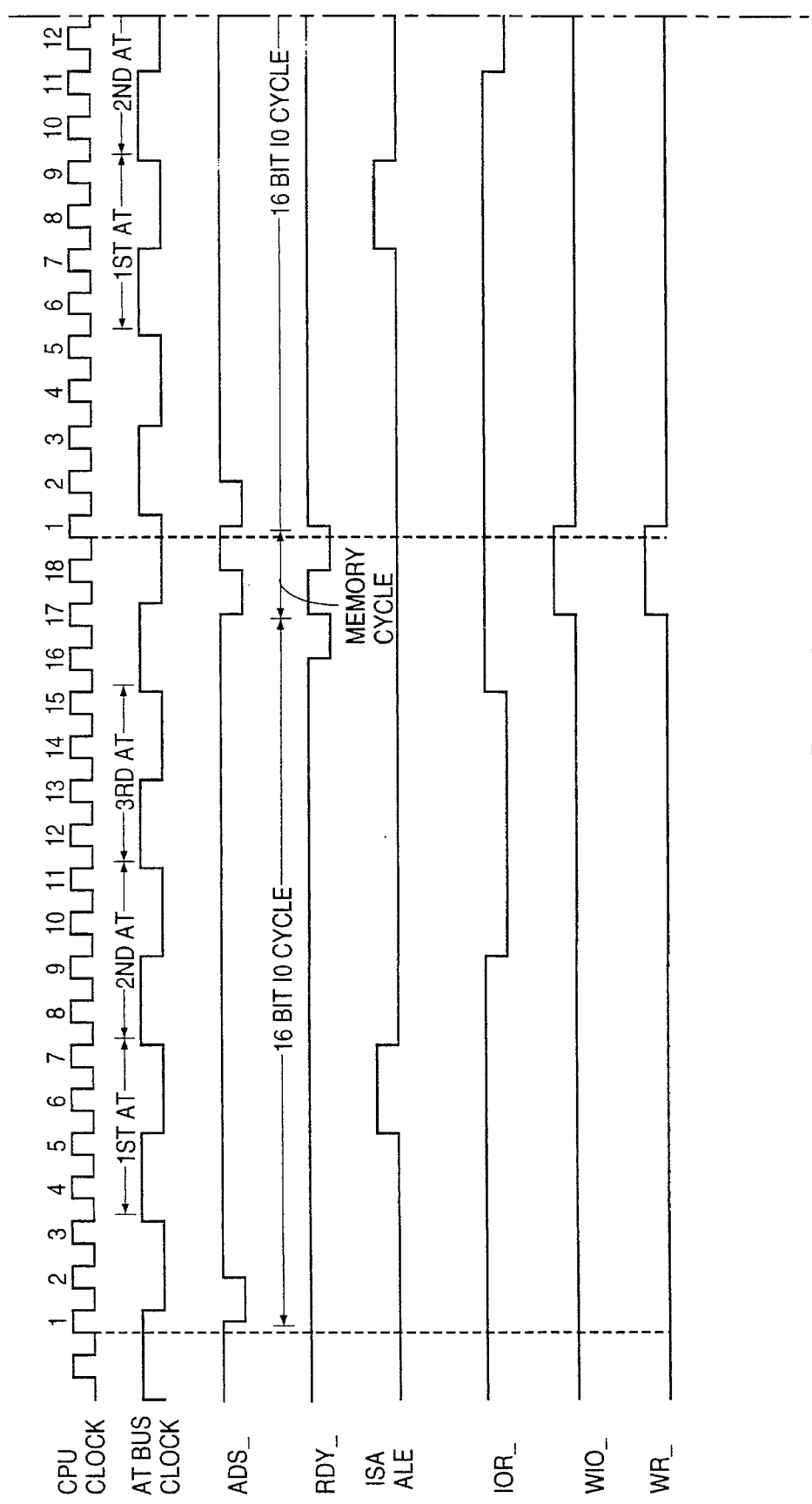
Figure 3A:
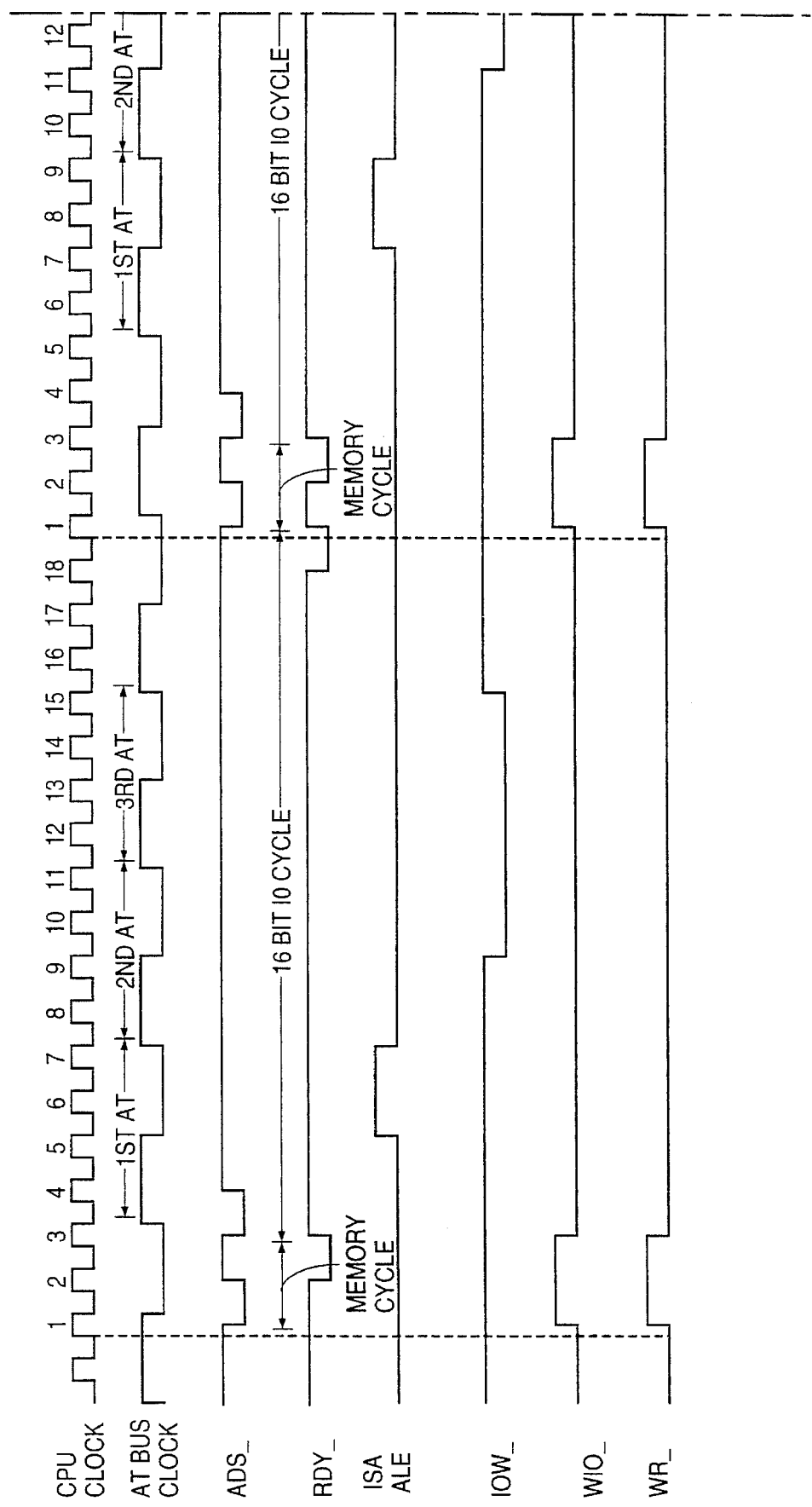

CPU 10 and system memory 12 interface with core logic 16 via system bus 14. Hard disk drive 18, which interfaces with core logic 16 via hard disk controller 20 and ISA AT bus 22, is configured and operable in the manner described in connection with FIG. 1. AT bus peripherals such as video adapter 26 are plugged into expansion slots 24 connected to ISA bus 22.

System bus 14 consists of a 16/32/64-bit system data bus, a 16/24/32-bit system address bus, and control signals. ISA bus 22 is formed with a 16-bit data bus, a 24-bit address bus, and control signals. CPU 10 operates system bus 14 at 20–66 MHz, typically 33 MHz. ISA bus 22 runs at 6–8 MHz, typically 8 MHz.

CPU 10, memory 12, bus 14, core logic 16, bus 22, and slots 24 are normally situated on a main (printed circuit) board. Hard disk controller 20 can be situated on the main board and connected directly to ISA bus 22 as in the example shown in FIG. 4. Alternatively, hard disk controller 20 can be situated on a separate PCB and plugged into one of expansion slots 24.

Core logic 16 consists of a memory controller 28 and an ISA AT bus control system. In turn, the ISA AT bus control system is formed with an accelerator 32 for ANSIS ATA compliant hard drive and an ISA bus controller 34 typically of conventional design. Hard drive accelerator 32 and ISA bus controller 34 interface with system bus 14 and ISA bus 22.

ISA hard drive accelerator 32 contains a hard drive control and state machine 38, an 8-byte first-in-first-out ("FIFO") read buffer 40, and a 4-byte write buffer 42. Buffers 40 and 42 temporarily store data being transferred between system memory 12 and hard drive 18 via CPU 10, hard disk controller 20 and buses 14 and 22 under the control of machine 38.

Read buffer 40 is divided into four units 54 of 2-byte wide addressable buffer memory that receive 16 bits of data from ISA bus 22. Units 54 are connected by way of a pair of 4-to-1 multiplexers ("MUXes") 56 in the manner shown in FIG. 4 for supplying 32 bits of data to system bus 14. The two MUXes 56 are identified as MUX-1 and MUX-2.

Each MUX 56 has four data inputs, a data output, and a selection input. Each data input or output is 16 bits wide. The selection input is 2 bits wide for selecting one of the four data inputs. MUX 56 then routes the selected 16-bit input data to the MUX data output.

MUX-1 has its 16 output lines connected to data lines 0–15 of system bus 14, while MUX-2 has its 16 output lines connected to data lines 16–31 of system bus 14. The four inputs of each MUX 56 are connected to the four units of read buffer 40. Read index address RIND is supplied to the selection inputs of MUXes 56.

To ensure that hard disk data is delivered to CPU 10 in the same sequence as the data is stored into read buffer 40 after being retrieved from hard disk 18, units 54 are connected to MUXes 56 as shown in FIG. 4 so that:

(1) For 16-bit CPU IO operations, MUX-1 cyclically outputs the 16-bit data from units 54 in direct sequence (i.e., unit-1, then unit-2, then unit-3, then unit-4, and then back to unit-1 to start another cycle) to data lines 0–15 of system bus 14, where RIND is advanced by 1 after every IO operation.

(2) For 32-bit CPU IO operations, MUXes 56 cyclically output the 32-bit data from units 54 in alternating sequence (e.g., unit-1 and unit-2 respectively for MUX-1 and MUX-2, then unit-3 and unit-4 respectively for MUX-1 and MUX-2, and then back to unit-1 and unit-2 to start another cycle) to data lines 0–31 of system bus 14, where RIND is advanced by 2 after every IO operation.

The following table shows how MUXes 56 deliver data to system bus 14 for the four possible RIND values.

| RIND | DATA ON DATA LINES 0–15 OF SYSTEM BUS 14 (OUTPUTTED BY MUX-1) | DATA ON DATA LINES 16–31 OF SYSTEM BUS 14 (OUTPUTTED BY MUX-2) |
| --- | --- | --- |
| 0 | Data of unit-1 | Data of unit-2 |
| 1 | Data of unit-2 | Data of unit-3 |
| 2 | Data of unit-3 | Data of unit-4 |
| 3 | Data of unit-4 | Data of unit-1 |

Write buffer 42 is divided into two units (upper and lower) 58 of 16-bit buffer memories that receive 16 or 32 bits of data from system bus 14 in the way depicted in FIG. 4. Buffer memories 58 are connected by way of a 2-TO-1 MUX 60 for supplying 16 bits of data to ISA bus 22.

Control and state machine 38 is formed with a word counter 44, a read buffer read index address register 45, a burst cycle register 46, a read buffer write index address register 47, a state machine 48, a 10-bit hard disk address latch 49, a machine state register 50, and buffer state flags (indicators) EMPTY 62, HALF-FULL 63, and FULL 64.

State machine 48 provides a write buffer write control signal WBFWR and a write buffer selection signal SDSEL.

Word counter 44 keeps track of the amount of data, in units of words, that has been moved to read buffer 40 since the start of the reading of a sector in hard drive 18. Machine state register 50 keeps track of the state of machine 48. There are five possible states: idle ("IDLE"), read initialization ("INIT-RD"), burst read ("BURST-RD"), suspend read ("SUSPEND-RD"), and end read ("END-RD").

State register 50 is set to the IDLE state if there is no hard disk data transfer on going. State register 50 is set to the INIT-RD state when CPU 10 starts to read data from a sector of hard disk 18. State register 50 is set to BURST-RD state when machine 48 starts to read data from a sector of hard disk 18. Machine 48 stays in the BURST-RD state during the entire read hard disk sector period. During the BURST-RD state, state register 50 may be set to the SUSPEND-RD state if machine 48 temporary suspends the hard disk read operation when certain events arise. Machine 48 returns to the BURST-RD state after events are taken care of. State register 50 is set to the END-RD state, when a sector of data has been completely transferred from hard disk 18 to read buffer 40.

Buffer state flags 62, 63, and 64 keep track of the state of read buffer 40. If no data is available in read buffer 40, EMPTY 62 is set to 1; otherwise it is set to 0. If more than two units 54 contain data from hard disk 18, HALF-FULL flag 63 is set to 1; otherwise, it is set to 0. If all four units 54 contains data for CPU 10 to retrieve, FULL flag 64 is set to 1; otherwise, it is set to 0.

Register 47 provides the index address of the particular storage unit 54 for receiving data from hard drive 18 via ISA bus 22. Register 47 is 2 bits wide. Therefore, its value can be 0, 1, 2, or 3 respectively corresponding to unit-1, unit-2, unit-3, or unit-4 of read buffer 40.

The RIND output of register 45 is connected to the selection inputs of MUXes 56 for selecting two units 54 to deliver data to CPU 10. For a 16-bit hard disk read cycle, CPU 10 latches only the data on data lines 0–15 of system bus 14, even though 32 bits of data are available on data lines 0–31. For a 32-bit cycle, CPU 10 latches the full data on data lines 0–31 of system bus 14. Register 45 is a 2-bit register whose value is 0, 1, 2, or 3.

Register 49 is used to latch IO data port address HD-ADDR of hard drive 18. The HD-ADDR address is output to ISA bus 22 for supplying the IO port address while machine 48 generates an AT IO cycle to access hard drive. Signal WBFWR enables buffer 42 to latch data from system bus 14 while CPU 10 asserts an IO write cycle. Signal SDSEL causes multiplexer 60 to select one of units 58 of write buffer 42 and output its data to ISA bus 22 when state machine 48 generates an AT IO cycle to store data into hard disk 18.

Burst cycle register 46 determines the duration of a hard disk IO cycle generated by machine 48. Register 46 is software programmed to select 2, 3, 4, or 5 AT clocks for each hard disk IO cycle.

Hard drive accelerating system 32 enables data transfer from hard drive 18 to system memory 12 to be decomposed into two concurrent executable operations: moving data from hard drive 18 to read buffer 40, called "AT READ DISK", and moving data from read buffer 40 to system memory 12. These two operations are respectively executed by control and state machine 38 and CPU 10.

Control and state machine 38 executes "AT READ DISK" operations to fetch data from hard drive 18 and store it into read buffer 40. CPU 10 is responsible for moving data from read buffer 40 into system memory 12 via the REP INS instruction as in a conventional ISA AT system. Control and state machine 38 also coordinates CPU read IO operations with the state machine "AT READ DISK" operations so that the two operations can be performed concurrently and achieve optimal performance.

Figure 7:
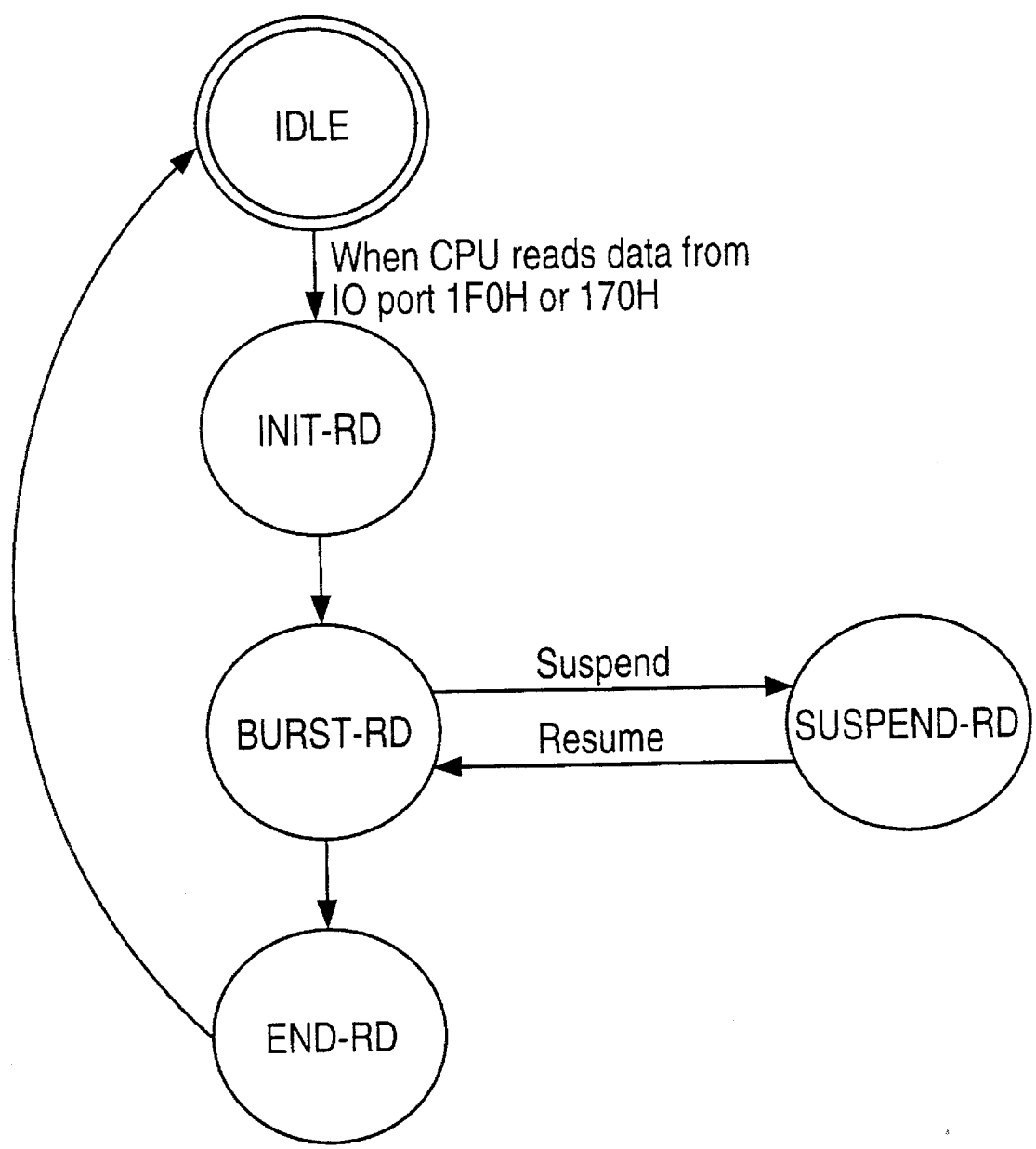
FIG. 7 is a state diagram for the inventive system of FIG. 4.

FIGS. 7 and 8 show the state diagram and control flow of state machine 48 for a complete hard disk read cycle. Machine 48 normally stays in the IDLE state and does nothing but watch IO cycles asserted by CPU 10. Machine 48 enters the INIT-RD state when CPU 10 asserts an IO READ cycle to fetch data from the hard drive sector buffer through IO port 1F0H or 170H. Machine 48 latches the IO port address into register 49, resets registers 45 and 47, and word counter 44, and enters the BURST-RD state.

In the BURST-RD state, state machine 48 starts a sequence of AT READ DISK cycles to transfer data from hard drive 18 to read buffer 40. Machine 48 first outputs the IO port address HD-ADDR from register 49 to ISA bus 22, and generates ISA bus control signals such as signals ALE and IOR_ to fetch data from hard disk 18. Data is fetched from hard drive 18 via ISA bus 22 and stored into a unit 54 having the WIND address specified by register 47. Address index register 47 is then increased by 1 to point to a unit 54 of read buffer 40 for the next 16-bit data from hard drive 18.

The AT READ DISK cycle is continuously asserted by machine 48 until word counter 44 reaches 256. Counter 44 is increased by 1 after every 16-bit AT READ DISK cycle during the BURST-RD period. When counter 44 reaches 256, the AT READ DISK is terminated, and machine 48 enters the END-RD state since the data from a whole hard disk sector has been transferred into read buffer 40.

In the END-RD state, state machine 48 monitors the value of EMPTY flag 62. When EMPTY 62 is set to 1 after a CPU IO read operation, machine 48 changes machine state 50 to IDLE, and completes the operation of transferring 512 bytes—i.e. one sector—of data from read buffer 40 to system memory 12. A subsequent IO read operation on data port 1F0H or 170H initiated by CPU 10 will trigger machine 48 to start a new AT READ DISK cycle extending from INIT-RD through BURST-RD to END-RD.

After every AT READ DISK operation, state machine 48 increases index register 47 by 1, sets EMPTY 62 to 0, and sets flags HALF-FULL 63 and FULL 64 according to the following rules:

(a) If WIND is equal to RIND, set FULL 64 and HALF-FULL 63 both to 1; otherwise set FULL 64 to 0, and go to next rule;

(b) If WIND is equal to RIND +1, set HALF-FULL 63 to 0; otherwise set HALF-FULL 63 to 1.

An AT READ DISK operation may be temporary suspended during the BURST-RD state when read buffer 40 is full. The AT READ HARD DISK operation is immediately resumed by state machine 48 after a CPU initiated hard disk read operation which causes FULL flag 64 to be reset to 0. Machine 48 may enter the SUSPEND-RD state and relinquish the ISA bus control right to ISA bus controller 34 during the BURST-RD period if other types of AT bus cycles, CPU hold cycles or DRAM hidden refresh cycles are asserted by ISA bus controller 34. Machine 48 returns to the BURST-RD state immediately after all of those AT cycles are done.

While state machine 48 is busy moving data from hard drive 18 to read buffer 40, CPU 10 executes a REP INS instruction and repeatedly generates IO read cycles to retrieve data from data port 1F0H or 170H of hard drive 18.

Instead of directly retrieving data from hard drive 18 via bus controller 34, machine 48 is activated to provide data for CPU 10 from read buffer 40 based on a FIFO scheme. State machine 48 enables (a) MUX-1 to output the data of unit 54 selected by signal RIND to data lines 0–15 of system bus 14 and (b) MUX-2 to output the data of unit 54 selected by signal RIND to data lines 16–31 of system bus 14. State machine 48, in the mean time, supplies data ready signal RDY_ to complete a CPU IO read cycle.

The CPU IO read cycle may be prolonged until data is available in read buffer 40 for CPU 10 to access. This could happen if EMPTY flag 62 is 1 for a 16-bit IO read operation, or both HALF-FULL flag 63 and FULL flag 64 are 0 for a 32-bit IO read operation.

After every CPU IO read cycle from read buffer 40, state machine 48 resets FULL flag 64 to 0, and increases the content of register 45 by 1 for a 16-bit IO read cycle, or by 2 for a 32-bit IO read cycle. Machine 48 then adjusts the other two flags HALF-FULL 63 and EMPTY 62 according to the following rules:

(a) If WIND is equal to RIND, set HALF-FULL 63 to 0, and set EMPTY 62 to 1; otherwise set EMPTY 62 to 0, and go to next rule;

(b) If WIND is equal to RIND+1, set HALF-FULL 63 to 0; otherwise set HALF-FULL 63 to 1.

Figure 5:
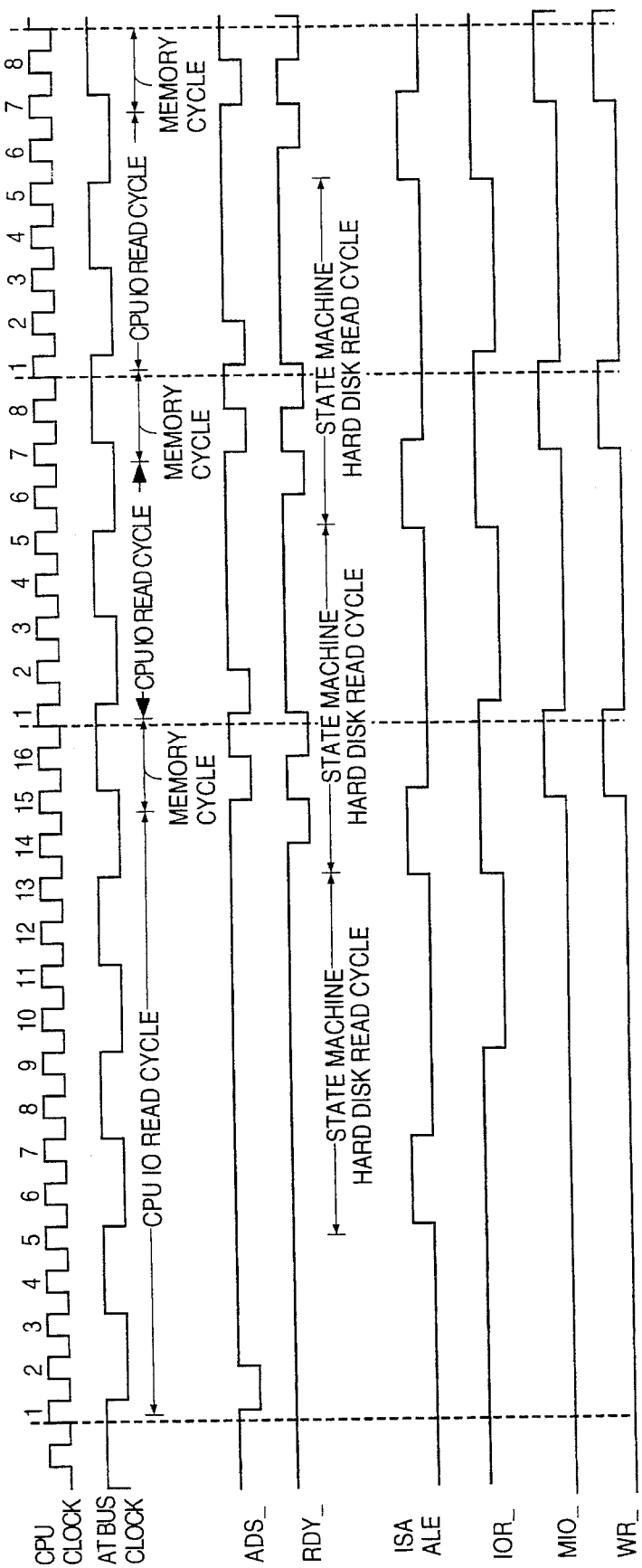
FIG. 5 is a timing diagram for hard drive read cycles of the inventive ISA-based system in FIG. 4.

FIG. 5 shows that hard disk control and state machine 38 accelerates the hard disk data transferring operation by overlapping the operation of moving data from read buffer 40 to system memory 12 with the operation of moving data from hard drive 18 to read buffer 40. Moving data from read buffer 40 to system memory 12 is much faster than moving data from hard drive 18 to read buffer 40, since the latter operation is restricted by the slow response of hard drive 18. The hard disk data transfer speed is therefore determined by how fast data can be moved from hard drive 18 to read buffer 40, or the cycle time of each AT READ DISK cycle performed by state machine 48.

The ANSIS ATA Rev. 3.0 defines the minimum hard disk access cycle time to be 240 ns, which is about 2 AT clocks for an 8-MHz AT bus. This translates into a maximum data transfer rate of 8 megabytes per second. FIG. 5 depicts the waveforms of the fastest hard disk read cycle—i.e., 2 AT clocks per hard disk read cycle in the inventive system.

Accelerator 32 decomposes the data transfer operation from system memory 12 to hard drive 18 into two operations: moving data from system memory 12 to write buffer 42, and moving data from write buffer 42 to hard drive 18. These two operations are executed concurrently by CPU 10 and state machine 48.

CPU 10 executes REP OUTS instructions, and continuously generates IO write cycles to move data from system memory 12 to the data port of hard drive 18. Instead of having CPU 10 wait for data to be stored into hard drive 18 via ISA bus controller 34, state machine 48 latches IO port address into register 49, and latches data into write buffer 42 by enabling signal WBFWR when it is ready to receive data. Ready signal RDY_ is then asserted to finish the CPU IO write cycle. This allows CPU 10 to start a new IO write cycle immediately while machine 48 moves data from write buffer 42 to hard drive 18.

For a 32-bit IO write cycle, the 32-bit data is first latched into 4 byte write buffer 42. State machine 48 then issues two consecutive 16-bit IO write cycles to move data from write buffer 42 into hard drive 18. In the first IO write cycle, signal SDSEL is set to logic level 0 and applied to MUX 60 to output data of lower-half write buffer 58 to the data lines of ISA bus 22. Signal SDSEL is then changed to logic level 1 and applied to MUX 60 to output data of upper-half write buffer 58 to the data lines of ISA bus 22 in the second 16-bit IO write cycle. The IO port address is supplied from register 49 to the address lines of ISA bus 22 for the two IO write cycles.

For a 16-bit IO write command, data is latched into lower-half write buffer 58, which is connected to data lines 0–5 of system bus 14. State machine 48 then outputs data from lower-half write buffer 58 to the data lines of ISA bus 22 by setting signal SDSEL to logic level 0, supplies IO port address from register 49 to the address lines of ISA bus 22, and initiates a 16-bit IO write cycle to move data into hard drive 18 and then prepares to receive new data from CPU 10.

Figure 6:
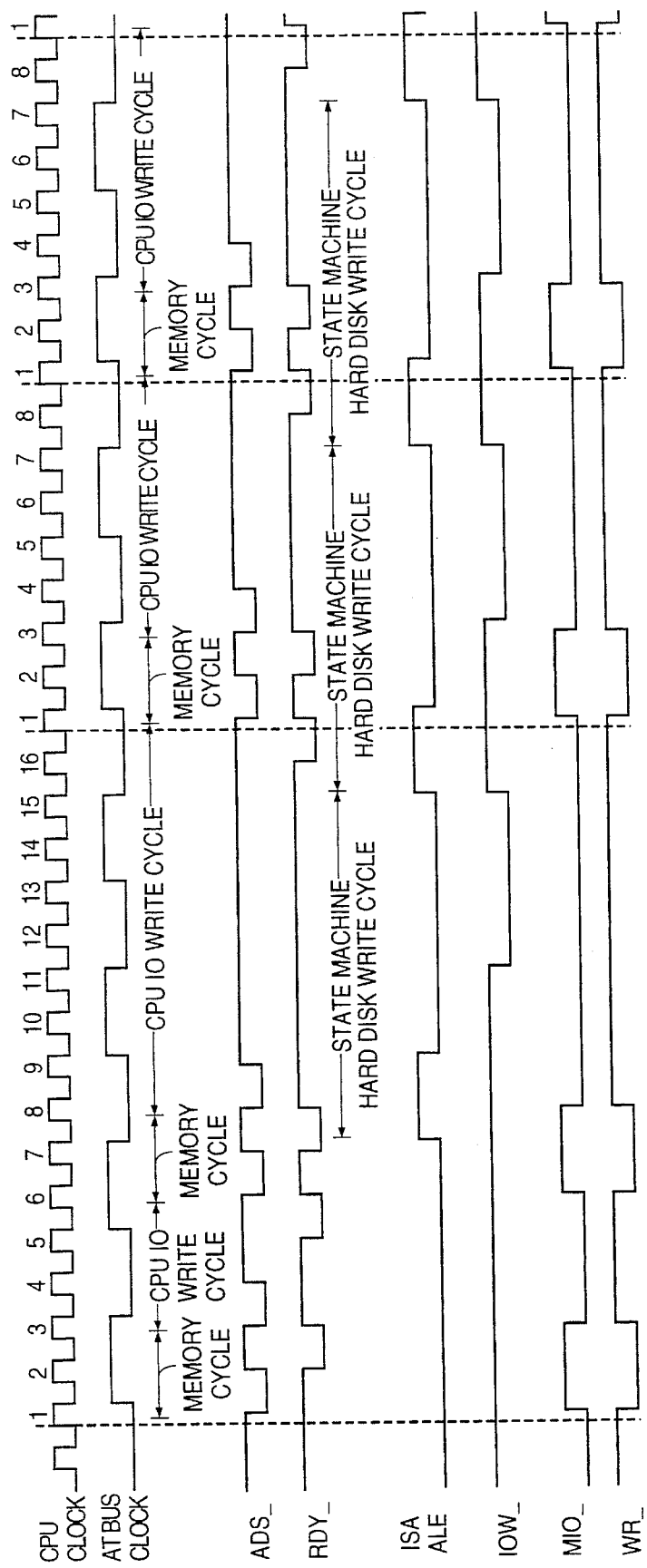
FIG. 6 is a timing diagram for hard drive write cycles of the inventive ISA-based system in FIG. 4.

FIG. 6 shows signal waveforms of a 16-bit hard disk write operation of the inventive system. Except for the first 16-bit operation, the nth hard disk write operation performed by state machine 48 is overlapped with the (n+1)th memory read operation performed by CPU 10. Moving data from system memory 12 to write buffer 42 is much faster than moving data from write buffer 42 to hard drive 18. Therefore, the data transfer speed is decided by the data transfer rate from write buffer 42 to hard drive 18.

The ANSIS ATA Rev. 3.0 defines the minimum IO write cycle time to be 240 ns, which is about 2 AT clocks for an 8-MHz AT bus. The maximum data transfer rate is, therefore, 8 megabytes per second. FIG. 6 depicts the waveforms of the fastest hard disk write cycle—i.e., 2 AT clocks per hard disk read cycle in the inventive system.

Software programmable 2-bit burst cycle hardware register 46 is used in state machine 38 to adjust the cycle time of hard drive read or write cycle for different types of hard drive. As shown in the following table, the AT hard disk cycle generated by machine 48 can be from 2 to 5 AT clocks depending on how register 46 is programmed. Also shown on the table are the maximum data transfer rate for each register setting.

| BURST CYCLE REGISTER SETTING | AT CLOCKS PER AT IO CYCLE | MAXIMUM HARD DISK DATA TRANSFER RATE (megabytes/second) |
|---|---|---|
| 00 | 5 | 3.4 |
| 01 | 4 | 4 |
| 10 | 3 | 5.3 |
| 11 | 2 | 8 |

While a particular embodiment of the invention has been described here, the invention is not limited to this embodiment. Various modifications and variations may be made without departing from the spirit and scope of the invention as defined in the appended claims.

We claim:

1. A hard disk accelerating system for a computer that contains a hard disk drive, a system memory, and a central processing unit ("CPU") for generating input-output ("IO") read/memory write cycles to transfer data from the hard drive to the system memory and for generating memory read/IO write cycles to transfer data from the system memory to the hard drive, the hard drive being divided into sectors and having a hard-drive data register, the CPU and system memory being coupled to a first bus, the hard drive being coupled to a second bus that operates at a lower clock rate than the first bus, the accelerating system comprising the following elements for decomposing disk access operation for each of read and write into at least two tasks which can be executed concurrently:

a read buffer for storing data received from the hard drive;

a write buffer for storing data to be moved to the hard drive; and a control and state machine that comprises
- (a) a word counter for keeping track of the number of data words moved into the read buffer from the hard drive since the accelerating system began to read a sector of the hard drive;
- (b) a first address register for pointing to a unit of the read buffer for storing the incoming data from the hard drive;
- (c) a second address register for pointing to a unit of the read buffer for the CPU to access;
- (d) an address latch register for latching the address of the hard-drive data register;
- (e) a plurality of buffer status flags for tracking the status of the read buffer; and
- (f) a state machine for monitoring IO operations performed on the hard drive, determining when to start, suspend, resume, and end fetching data from a sector of the hard drive, generating hard drive read cycles to read data from the hard drive, causing data to be transferred from the hard drive to the read buffer during a hard drive read cycle concurrently while data is being transferred from the read buffer to the system memory during a prior IO read/memory write cycle, generating hard drive write cycles to write data to the hard drive, and causing data to be transferred from the write buffer to the hard drive during a hard drive write cycle concurrently while data is being transferred from the system memory to the write buffer during a subsequent memory read/IO write cycle.

2. An accelerating system as in claim 1 wherein the read buffer comprises a first-in-first-out buffer.

3. An accelerating system as in claim 1 wherein the read buffer is at least twice the bit size of an IO command needed to improve the hard disk data transfer speed.

4. An accelerating system as in claim 1 wherein the read buffer is at least 32 bits wide, and comprises at least two 16-bit units to support 16-bit IO commands so that, while the CPU is accessing data from one of the 16-bit units, the state machine can read data from the hard drive and store it into another of the 16-bit units.

5. An accelerating system as in claim 1 wherein the accelerating system is coupled to the buses.

6. An accelerating system as in claim 5 wherein the first bus is a CPU system bus, and the second bus is an industry standard architecture ("ISA") advanced technology ("AT") bus.

7. An accelerating system as in claim 6 wherein the system complies to the American National Standard for Information Systems AT Attachment Specification.

8. An accelerating system as in claim 7 further including an integrated device electronics ("IDE") IO controller coupled between the hard drive and the ISA AT bus.

9. An accelerating system as in claim 8 wherein the IDE IO controller comprises a conventional ISA hard disk controller card.

10. An accelerating system as in claim 6 further including logic means for suspending hard drive cycles for at least one of a normal AT cycle, a hidden refresh cycle, and a CPU hold cycle.

11. An accelerating system as in claim 6 further including a programmable hardware register for adjusting the hard disk read or write cycle time from 2 AT clocks to 5 AT clocks.

12. An accelerating system as in claim 11 wherein the hardware register is software programmable.

13. An accelerating system as in claim 1 wherein:

each hard drive read cycle is part of an overall read cycle that includes an IO read/memory write cycle; and each hard drive write cycle is part of an overall write cycle that includes a memory read/IO write cycle.

14. An accelerating system as in claim 13 wherein:

each IO read/memory write cycle comprises (a) an IO read cycle during which data is transferred from the read buffer to the CPU and (b) a memory write cycle during which data is transferred from the CPU to the system memory; and each memory read/IO write cycle comprises (a) a memory read cycle during which data is transferred from the system memory to the CPU and (b) an IO write cycle during which data is transferred from the CPU to the write buffer.

15. An accelerating system as in claim 13 wherein the read buffer comprises at least two read units controlled so that the state machine causes data to be transferred from the hard drive to one of the read units concurrently while the CPU is accessing data from another of the read units to transfer the so-accessed data to the system memory.

16. A hard drive accelerating system for a computer that contains a hard disk drive, a system memory, and a central processing unit ("CPU") which (a) generates input-output ("IO") read/memory write cycles for transferring data from the hard drive to the system memory and (b) generates memory read/IO write cycles for transferring data from the system memory to the hard drive, the CPU and the system memory being coupled to a first bus, the hard drive being coupled to a second bus that operates at a lower clock rate than the first bus, the accelerating system comprising:

a read buffer for storing data received from the hard drive;

a write buffer for storing data to be transferred to the hard drive; and a state machine (a) for generating hard drive read cycles each being part of an overall read cycle that includes an IO read/memory write cycle generated by the CPU, (b) for causing data to be transferred from the hard drive to the read buffer by way of the second bus during the hard drive read cycle of an overall read cycle concurrently while data is being transferred from the read buffer to the system memory by way of the first bus during the IO read/memory write cycle of at least one prior overall read cycle, (c) for generating hard drive write cycles each being part of an overall write cycle that includes a memory read/IO write cycle generated by the CPU, and (d) for causing data to be transferred from the write buffer to the hard drive by way of the second bus during the hard drive write cycle of an overall write cycle concurrently while data is being transferred from the system memory to the write buffer by way of the first bus during the memory read/IO write cycle of at least one subsequent overall write cycle.

17. An accelerating system as in claim 19 wherein each IO read/memory write cycle comprises (a) an IO read cycle during which data is transferred from the read buffer to the CPU and (b) a memory write cycle during which data is transferred from the CPU to the system memory.

18. An accelerating system as in claim 19 wherein the read buffer comprises at least two read units controlled so that data is transferred from the hard drive to one of the read units concurrently while data is being transferred from another of the read units to the system memory.

19. An accelerating system as in claim 16 wherein each memory read/IO write cycle comprises (a) a memory read cycle during which data is transferred from the system memory to the CPU and (b) an IO write cycle during which data is transferred from the CPU to the write buffer.

20. An accelerating system as in claim 16 wherein data is transferred from the write buffer to the hard drive during an overall write cycle concurrently while data is being transferred from the system memory to the write buffer during the next overall write cycle.

21. An accelerating system as in claim 16 wherein:

each IO read/memory write cycle comprises (a) an IO read cycle during which data is transferred from the read buffer to the CPU and (b) a memory write cycle during which data is transferred from the CPU to the system memory; and each memory read/IO write cycle comprises (a) a memory read cycle during which data is transferred from the system memory to the CPU and (b) an IO write cycle during which data is transferred from the CPU to the write buffer.

* * * * *

UNITED STATES PATENT AND TRADEMARK OFFICE
CERTIFICATE OF CORRECTION

PATENT NO. : 5,594,926
DATED : January 14, 1997
INVENTOR(S) : Ying-Feng Chang and Juei-Sheng Sheu It is certified that error appears in the above-indentified patent and that said Letters Patent is hereby corrected as shown below:

Col. 5, line 3, "temporary" should read --temporarily--;
line 18, "an" should read "a".
Col. 7, line 18, "temporary" should read --temporarily--.
Col. 8, line 52, "temporary" should read --temporarily--.
Col. 9, line 8, "mean time" should read --meantime--.
Col. 10, line 8, "0-5" should read "0-15".
Claim 17, first line, "19" should read --16--.
Claim 18, first line, "19" should read --16--.

Signed and Sealed this

Twenty-fourth Day of June, 1997

Attest:

BRUCE LEHMAN

Attesting Officer        Commissioner of Patents and Trademarks